United States Patent
Mallmann et al.

(10) Patent No.: US 12,168,618 B2
(45) Date of Patent: Dec. 17, 2024

(54) PHOSPATE RECOVERY BY ACID RETARDATION

(71) Applicant: Evoqua Water Technologies LLC, Pittsburgh, PA (US)

(72) Inventors: Thomas Kenneth Mallmann, Rockford, IL (US); Justin W. Higgs, Nolensville, TN (US); Kenneth Ray Workman, Autryville, NC (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 1013 days.

(21) Appl. No.: 16/996,277

(22) Filed: Aug. 18, 2020

(65) Prior Publication Data

US 2020/0377386 A1    Dec. 3, 2020

Related U.S. Application Data

(63) Continuation of application No. 15/124,564, filed as application No. PCT/US2015/019149 on Mar. 6, 2015, now Pat. No. 10,843,941.

(Continued)

(51) Int. Cl.
*C02F 1/42* (2023.01)
*C01B 25/18* (2006.01)
(Continued)

(52) U.S. Cl.
CPC ............... *C02F 1/42* (2013.01); *C01B 25/18* (2013.01); *C01B 25/234* (2013.01); *C02F 1/008* (2013.01); *C02F 1/04* (2013.01); *C02F 1/441* (2013.01); *C02F 1/66* (2013.01); *B01J 39/04* (2013.01); *B01J 41/04* (2013.01);
(Continued)

(58) Field of Classification Search
CPC .... C02F 1/42; C02F 1/008; C02F 1/04; C02F 1/441; C02F 1/66; C01B 25/18; C01B 25/234
See application file for complete search history.

(56) References Cited

U.S. PATENT DOCUMENTS

| 6,280,630 B1 | 8/2001 | Ramsay |
| 6,375,851 B1 | 4/2002 | Sterling |

(Continued)

FOREIGN PATENT DOCUMENTS

| TW | I428293 B | 3/2014 |
| WO | 2005/118222 | 12/2005 |

OTHER PUBLICATIONS

Ion exchange resins, Mitsubishi Chemical, 5 pages (Year: 2016).

(Continued)

*Primary Examiner* — James A Fiorito

(57) ABSTRACT

A method of recovering phosphoric acid from process water includes directing a process water stream having a pH and a first concentration of phosphoric acid and at least one salt into a vessel, contacting the process water stream with a sorption agent in the vessel, the sorption agent adsorbing phosphoric acid from the process water, withdrawing a first effluent including a first concentration of the at least one salt and a second concentration of phosphoric acid from the vessel, and contacting the sorption agent including the phosphoric acid with water, at least a portion of the phosphoric acid desorbing from the ion exchange media into the water to form a second effluent having a third concentration of phosphoric acid.

4 Claims, 7 Drawing Sheets

Related U.S. Application Data

(60) Provisional application No. 61/950,359, filed on Mar. 10, 2014.

(51) Int. Cl.
| | | |
|---|---|---|
| *C01B 25/234* | (2006.01) | |
| *C02F 1/00* | (2023.01) | |
| *C02F 1/04* | (2023.01) | |
| *C02F 1/44* | (2023.01) | |
| *C02F 1/66* | (2023.01) | |
| *B01J 39/04* | (2017.01) | |
| *B01J 41/04* | (2017.01) | |
| *C02F 101/10* | (2006.01) | |

(52) U.S. Cl.
CPC .. *C02F 2001/422* (2013.01); *C02F 2001/425* (2013.01); *C02F 2101/105* (2013.01); *C02F 2209/005* (2013.01); *C02F 2209/006* (2013.01); *C02F 2209/06* (2013.01)

(56) References Cited

U.S. PATENT DOCUMENTS

| | | |
|---|---|---|
| 6,652,758 B2 | 11/2003 | Krulik |
| 6,916,427 B2 | 7/2005 | Roth |
| 7,560,031 B1 | 7/2009 | Astley et al. |
| 7,588,744 B1 | 9/2009 | Sylvester |
| 8,568,590 B2 | 10/2013 | Barak |
| 2005/0145572 A1 | 7/2005 | Jangbarwala |
| 2010/0068113 A1 | 3/2010 | Cohen |
| 2011/0132839 A1 | 6/2011 | Zuback et al. |
| 2012/0035281 A1 | 2/2012 | Suzuki et al. |
| 2012/0070360 A1 | 3/2012 | Wissemborski et al. |
| 2012/0100051 A1 | 4/2012 | Choi et al. |
| 2012/0160772 A1 | 6/2012 | Kearney et al. |
| 2013/0062289 A1 | 3/2013 | Cote et al. |
| 2014/0183045 A1 | 7/2014 | Fu et al. |
| 2014/0231359 A1 | 8/2014 | Cote et al. |
| 2015/0166352 A1 | 6/2015 | Berry |
| 2015/0308001 A1 | 10/2015 | Barak |
| 2015/0368137 A1 | 12/2015 | Miller et al. |
| 2016/0130164 A1 | 5/2016 | Whittier et al. |
| 2017/0113957 A1 | 4/2017 | Eckelberry |
| 2017/0362102 A1 | 12/2017 | Ganzi et al. |

OTHER PUBLICATIONS

Awual, "Assessing of Phosphorus Removal by Polymeric Anion Exchangers," Desalination 281 (2011), pp. 111-117.

Thomas, Shane, "International Search Report", International Patent Application No. PCT/US2015/019149, mailed Jun. 3, 2015, 2 pages.

Nickitas-Etienne, Athina, "International Preliminary Report on Patentability", International Patent Application No. PCT/US2015/019149, mailed Sep. 13, 2016, 7 pages.

Thomas, Shane, "International Search Report", International Patent Application No. PCT/US2019/047490, mailed Nov. 13, 2019, 2 pages.

Thomas, Shane, "Written Opinion of The International Searching Authority", International Patent Application No. PCT/US2019/047490, mailed Nov. 13, 2019, 12 pages.

Perpich, B, Jr., et al. Mobile Wastewater Treatment Helps Remediate Concentrated Acidic Process Water at Fertilizer Plant. Florida Water Resources Journal. Jul. 2005; p. 24, Left col. First Paragraph to Fourth Paragraph; p. 26, Left col. Third Paragraph; p. 28, Left col. Third Paragraph to Fourth Paragraph.

Copenheaver, Blaine R., "International Search Report", International Patent Application No. PCT/US2019/047566, mailed Oct. 29, 2019, 2 pages.

Copenheaver, Blaine R., "Written Opinion of The International Searching Authority", International Patent Application No. PCT/US2019/047566, mailed Oct. 29, 2019, 6 pages.

Thomas, Shane, "International Search Report", International Patent Application No. PCT/US2019/047558, mailed Nov. 8, 2019, 2 pages.

Thomas, Shane, "Written Opinion of The International Searching Authority", International Patent Application No., PCT/US2019/047558, mailed Nov. 8, 2019, 11 pages.

Thomas, Shane, "International Search Report", International Patent Application No. PCT/US2019/047563, mailed Nov. 13, 2019, 2 pages.

Thomas, Shane, "Written Opinion of The International Searching Authority", International Patent Application No. PCT/US2019/047563, mailed Nov. 13, 2019, 6 pages.

El-Ghafari, Rasha, "Requisition by the Examiner in Accordance with Subsection 86(2) of the Patent Rules", Canadian Patent Application No. 2,939,530, mailed Dec. 15, 2020, 7 pages.

El-Ghafari, Rasha, "Requisition by the Examiner in Accordance With Subsection 86(2) of the Patent Rules", Canadian Patent Application No. 2,939,530, mailed Jul. 12, 2021, 3 pages.

PHOSPATE RECOVERY BY ACID RETARDATION

RELATED APPLICATIONS

This application is a continuation of and claims benefit under 35 U.S.C. 120 to co-pending U.S. patent application Ser. No. 15/124,564, titled PHOSPHATE RECOVERY BY ACID RETARDATION, filed Sep. 8, 2016, which claims priority under 35 U.S.C. § 119(e) to U.S. Patent Application Ser. No. 61/950,359 titled "PHOSPHATE RECOVERY BY ACID RETARDATION," filed on Mar. 10, 2014, each of which is herein incorporated by reference in its entirety for all purposes.

FIELD OF TECHNOLOGY

Aspects and embodiments disclosed herein relate to treatment of phosphate-containing waste water, and more particularly, to treatment of phosphate-containing waste water and recovery of desirable compounds, for example, phosphoric acid from the phosphate-containing waste water using acid retardation.

BACKGROUND

Phosphate-containing waste water, for example, waste water associated with and produced by phosphate manufacturing operations, referred to herein as "process water," is typically acidic and typically contains various dissolved constituents such as fluoride, ammonia, silica, sulfate, calcium, heavy metals, phosphate, magnesium, colloidal matter, organic carbon, and in some instances radium (a radioactive element). Ponds associated with past phosphate processing may contain billions of gallons of process water. There is an urgent environmental need to treat this process water, particularly in environmentally sensitive areas, or areas where population growth has come into closer contact with phosphate processing sites. Treatment of process water to reduce its toxicity and its volume has been a technological challenge of significant interest. The toxic or harmful contaminants present in process water should be at least partially removed or eliminated before treated process water is discharged into the environment to comply with regulatory guidelines and to protect the environment.

Various techniques have been used to reduce the level of toxic or harmful contaminants in process water before the treated process water is discharged to the environment. For example, double liming, followed by air stripping can be used. In this process lime is added to the process water in two stages, to promote precipitation of fluoride species and phosphate species, followed by high pH air stripping to remove ammonia. In another technique, process water is treated by chemical precipitation followed by reverse osmosis. Like double liming, such techniques raise the pH of influent water to promote precipitation and solids separation before reverse osmosis.

Another process that may be used to dispose of process water is deep well injection. This process injects the process water deep underground between impermeable layers of rocks to avoid polluting fresh water supplies. Proper geology is required for deep well injection sites, and a permit must be obtained prior to injecting the process water underground. Further, phosphate is not recoverable from process water in a deep well injection process.

Another process that could be used to treat process water is reverse osmosis. Reverse osmosis treats water having a low pH to remove contaminants by using one or more passes of reverse osmosis membranes with or without controlling the pH between passes.

Although the above referenced techniques may be used to treat process water, they are expensive and not effective at recovering concentrated phosphoric acid, which is a valuable product, from the process water.

SUMMARY

In accordance with an aspect of the present disclosure, there is provided a method. The method comprises directing a process water stream having a pH and a first concentration of phosphoric acid and at least one salt into a vessel, contacting the process water stream with a sorption agent in the vessel, the sorption agent adsorbing phosphoric acid from the process water stream, withdrawing a first effluent including a first concentration of the at least one salt and a second concentration of phosphoric acid from the vessel, and contacting the sorption agent including the adsorbed phosphoric acid with water, at least a portion of the phosphoric acid desorbing from the sorption agent into the water to form a second effluent having a third concentration of phosphoric acid.

In some embodiments, the third concentration of phosphoric acid is higher than the second concentration of phosphoric acid.

In some embodiments, the method further comprises adjusting the pH of the process water stream by the addition of an acid and/or a base prior to contacting the process water stream with the sorption agent.

In some embodiments, the at least one salt comprises one of a sulfate and a hexafluorosilicate.

In some embodiments, the method further comprises concentrating the recovered phosphoric acid by reverse osmosis.

In some embodiments, the method further comprises concentrating the recovered phosphoric acid by evaporation.

In some embodiments, the method further comprises recycling at least a portion of the first effluent into the vessel.

In some embodiments, the method further comprises combining at least a portion of the first effluent with the process water stream.

In some embodiments, the sorption agent is an anion exchange resin.

In accordance with another aspect disclosed herein, there is provided a system. The system comprises a vessel comprising a sorption agent, a source of a process water stream comprising a first concentration of phosphoric acid fluidly connected to an inlet of the vessel; a source of water having an outlet fluidly connected to the vessel, an effluent outlet of the vessel, the system configured to output a first effluent stream having a second concentration of phosphoric acid through the effluent outlet for a first period of time and to output a second effluent having a third concentration of phosphoric acid through the effluent conduit for a second period of time, the third concentration being higher than the second concentration, a source of a pH adjuster fluidly connected to the process water stream, a pH sensor configured to detect a pH of the process water stream and to output a pH signal indicative of the pH, and a controller operably coupled to the pH sensor and to the source of pH adjuster, the controller configured to receive the pH signal and to send a control signal to the source of pH adjuster causing the source of pH adjuster to dispense pH adjuster into the process water stream to be treated in response to receiving the signal.

In some embodiments, the vessel comprises a plurality of sorption agent columns or vessels arranged one of in series, in parallel, and in a combination of series and parallel.

In some embodiments, the sorption agent disposed in the vessel comprises cation exchange resin.

In some embodiments, the sorption agent disposed in the vessel comprises anion exchange resin.

In accordance with another aspect disclosed herein, there is provided a method. The method comprises directing a process water stream having a pH into a vessel, contacting the process water stream with a sorption agent in the vessel, the sorption agent excluding cations from entering into the sorption agent while nonionized phosphoric acid diffuses into the sorption agent, withdrawing a first effluent including a first concentration of at least one salt and a first concentration of phosphoric acid from the vessel, and contacting the sorption agent including the nonionized phosphoric acid diffused into the sorption agent with water, at least a portion of the nonionized phosphoric acid desorbing into the water to form a second effluent having a second concentration of phosphoric acid.

In some embodiments, the sorption agent is a cation exchange resin.

In some embodiments, the sorption agent is cation-saturated cation exchange resin.

In some embodiments, the method further comprises adjusting the pH of the process water stream to a level at which phosphoric acid in the process water stream is non-ionic.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
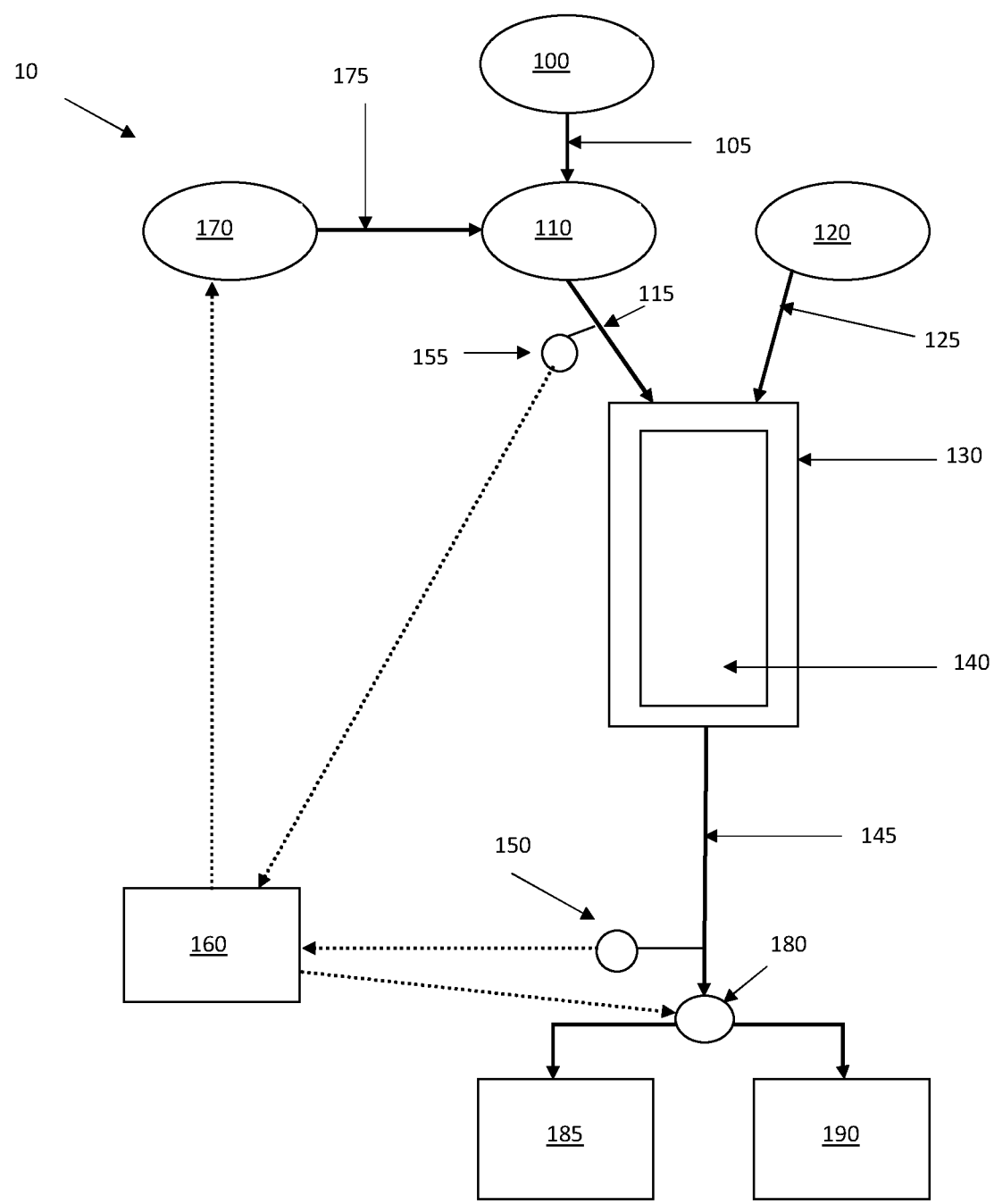
FIG. 1 is a schematic diagram illustrating a representative acid retardation system pertinent to one or more aspects of this disclosure.

Aspects and embodiments disclosed herein are directed to systems and methods of treating process water to, for example, separate phosphoric acid from acid salts, and render the treated process water more suitable for conventional treatment. Aspects and embodiments disclosed herein relate to acid retardation systems and methods of operation and facilitating thereof. Aspects and embodiments disclosed herein are not limited in application to the details of construction and the arrangement of components, systems, or subsystems set forth herein, and are capable of being practiced or of being carried out in various ways.

The presence of phosphate is a cause of eutrophication (i.e., nutrient enrichment due to human activity) in bodies of water. The most recognizable manifestations of eutrophication are algal blooms that occur during the summer. Chronic symptoms of over-enrichment of nutrients such as phosphate in bodies of water include low dissolved oxygen, fish kills, murky water, and depletion of desirable flora and fauna. In addition, the increase in algae and turbidity increases the need to chlorinate drinking water obtained from nutrient enriched bodies of water, which in turn, leads to higher levels of disinfection by-products that have been shown to increase the risk of cancer. Excessive amounts of nutrients can also stimulate the activity of microbes, such as *Pfisteria* which may be harmful to human health. In efforts to reduce occurrences of water body eutrophication, many point source dischargers have received stringent limits for phosphate concentration in effluent to be discharged into the environment.

It has been discovered that acid retardation systems can be utilized to remove phosphates in the form of phosphoric acid from process water. The extracted phosphoric acid can be concentrated, and can be reused in, for example, phosphate manufacturing processes, in the manufacture of fertilizers, or for other industrial uses.

Acid retardation is the process of separating acids from non-acids by chromatography. An example of an acid retardation process disclosed herein involves separating salts from acids by chromatographic separation on a sorption agent. For example, the sorption agent can be an adsorption agent. The sorption agent can be any agent which preferentially adsorbs phosphoric acid versus salts. For example, the sorption agent can be an ion exchange resin. The process can be carried out by running a volume of process water through a particle bed of the sorption agent and eluting with water. The salts are not adsorbed by the sorption agent, but instead pass through the sorption agent, causing the salts to elute first. The acids, however, are adsorbed by the sorption agent and desorbed with the addition of neutral water. The acids are therefore retarded and elute after the salts. No sorption agent regeneration is required, and no additional chemicals are required to separate the salts from the acid.

Acid retardation has been proposed for separating cations from phosphoric acid from metal plating bath wastewater. Process water differs from plating bath wastewater due to the high concentration of anionic impurities in the process water. Further, an acid retardation process for separation cations from phosphoric acid in plating bath wastewater does not include adjusting the pH of the water to affect the purity or the recovery of the acid.

With careful control of the pH of a process water stream, phosphate can be recovered from process water as phosphoric acid while ionic species, for example, sulfates and hexafluorosilicates are removed as salts. Careful adjustment and control of pH of the process water stream enables separation of anionic impurities as well as cationic impurities from the recovered phosphoric acid. The recovered phosphoric acid may be concentrated by reverse osmosis and/or evaporation.

Adjusting the pH of the process water stream involves the addition of an acid or a base to the process water prior to treatment of the process water in an acid retardation vessel. Adjusting the pH of the process water stream to a higher pH, for example, a pH of about 2 to a pH of about 3, yields high purity recovered phosphoric acid, while adjusting the pH of the process water stream to a lower pH, for example, a pH of about 1 to a pH of about 1.5, yields a greater amount of recovered phosphoric acid. At a higher pH, a greater amount of, for example, sulfate and hexafluorosilicate are present as salts rather than as acids, enabling better separation of these impurities from phosphoric acid. However, a higher pH causes more phosphate to be present as a salt and not readily recoverable as phosphoric acid. At a lower pH, a greater amount of, for example, sulfate and hexafluorosilicate are present as acids rather than as salts. Impurities present in process water to be treated as acids are more likely to elute with recovered phosphoric acid, reducing the purity of the recovered phosphoric acid. However, a lower pH causes more phosphate to be present as phosphoric acid, and therefore readily recoverable. The pH of the process water stream can be adjusted based on the desired end use of the recovered phosphoric acid. If a greater volume of phosphoric acid is desired, and a high degree of purity is not required, a lower pH may be selected. If high purity phosphoric acid purity is desired, or if purity is a greater concern than volume of the recovered phosphoric acid, a higher pH may be selected.

Adjusting the pH of the process water stream provides for control of the degree of separation of phosphoric acid from salts in the process water in the disclosed acid retardation process. The dissociation constants for various components of process water are presented in equations (1)-(7) below. At pH 2, most of the sulfate and hexafluorosilicate are present as neutral salts while most of the phosphate is present as phosphoric acid. Acid retardation separates the neutral salts from the free acids.

$$H_2SO_4 \rightarrow H^+ + HSO_4^- \quad pK_{a1} < 0 \quad (1)$$

$$HSO_4^- \rightarrow H^+ + SO_4^{-2} \quad pK_{a2} = 1.99 \quad (2)$$

$$H_2SiF_6 \rightarrow H^+ + HSiF_6^- \quad pK_{a1} < 0 \quad (3)$$

$$HSiF_6^- \rightarrow H^+ + SiF_6^{-2} \quad pK_{a2} = 1.92 \quad (4)$$

$$H_3PO_4 \rightarrow H^+ + H_2PO_4^- \quad pK_{a1} = 2.15 \quad (5)$$

$$H_2PO_4^- \rightarrow H^+ + HPO_4^{-2} \quad pK_{a2} = 7.20 \quad (6)$$

$$HPO_4^{-2} \rightarrow H^+ + PO_4^{-3} \quad pK_{a3} = 12.32 \quad (7)$$

In accordance with one or more embodiments, an acid retardation system receives process water from, for example, a phosphate manufacturing plant. The process water may be moved through the system by operations upstream or downstream of the system.

In one embodiment, a method to treat process water includes directing process water having a first concentration of phosphoric acid and at least one undesired salt into a vessel, and contacting the process water with a sorption agent in the vessel. The sorption agent adsorbs phosphate, in the form of phosphoric acid, from the process water, and allows salts to elute. The method further comprises withdrawing a first effluent including a first concentration of the at least one salt and a second concentration of phosphoric acid from the vessel. After an initial flushing of phosphoric acid remaining in the vessel from a previous operation cycle, for example, after passing from about 0.5 to about one bed volume of process water through the vessel, the concentration of phosphoric acid in the first effluent will be lower than the phosphoric acid concentration of the process water. Over time, as the sorption agent becomes saturated with phosphoric acid, the phosphoric acid concentration of the first effluent increases. In some embodiments, the process water stream is passed through the vessel until just prior to phosphoric acid break through to capture nearly as much phosphoric acid on the sorption agent as possible while not losing phosphoric acid to the first effluent. The volume of process water that results in the phosphoric acid breaking through and becoming detectable in the first effluent may be determined by testing performed during system startup and/or during periodic checks. The volume of process water to be passed through the vessel may then be adjusted and the flow of process water terminated prior to a volume that would have resulted in phosphoric acid breakthrough, for example, from about 0.5 to about one bed volume less than would have caused phosphoric acid breakthrough to have been observed.

The sorption agent including the adsorbed phosphoric acid is then contacted with water. At least a portion of the phosphoric acid is desorbed from the sorption agent to form a second effluent having a third concentration of phosphoric acid. The second effluent initially has a concentration of phosphoric acid lower than that of the process water stream and a concentration of salts close to that of the process water. Over time, however, as process water remaining in the vessel is flushed from the vessel, and the phosphate desorbs from the sorption agent into the water, the salt concentration drops and the phosphoric acid concentration of the second effluent increases to a level greater than the phosphoric acid concentration in the first effluent. The second effluent having the high phosphoric acid concentration may be captured as a source of recovered phosphoric acid. The second effluent may be captured until the phosphoric acid concentration drops to an end point concentration below which recovery is not considered economically beneficial, for example, until the cost of concentrating the phosphoric acid in the water of the second effluent approaches the commercial value of the recovered phosphoric acid. This end point concentration is, in some embodiments, a concentration substantially lower than the phosphoric acid concentration in the process water stream. In some embodiments, the process water stream is passed through the vessel until the volume of phosphoric acid in the second effluent reaches a predetermined volume.

The phosphoric acid captured in the second effluent may have a concentration above about 0.5% by weight to about 2% by weight. The purity of phosphoric acid captured from the second effluent may be between about 57% and about 80%, or, in some embodiments, above 87%.

Acid retardation systems as disclosed herein include one or more process control systems. In one embodiment, a control system of an acid retardation system instructs a pump to add an acid or a base to the process water stream to adjust the pH of the process water to a desired level prior to introduction into the vessel. In some embodiments, the base may be sodium hydroxide. In some embodiments, the acid may be sulfuric acid. The control system may instruct a pump to add an acid or a base to the process water stream to adjust the pH based on, for example, a desired concentration and/or purity of phosphoric acid to be recovered. For example, a higher pH of the process water stream yields higher recovered phosphoric acid purity, while a lower pH yields higher volume of recovered phosphoric acid. Strategic management of the pH of the process water stream may lead to overall improved recovery of phosphoric acid.

The control system may comprise a measurement system including one or more sensors. Non-limiting examples of sensors suitable for use in the methods and systems described herein may include ion specific phosphate probes or sensors, online colorimetric phosphate analyzers, pH sensors, conductivity sensors, or any sensor capable of providing an indication of the concentration of phosphate present at any point within the treatment system, flow sensors, as well as any other sensor that measures process conditions. For example, online phosphate analyzers such as a Hach® 5500 phosphate analyzer or a Hach® Phosphax phosphate analyzer may be used. The sensors may be positioned, for example, so as to determine the concentration of phosphoric acid, pH, conductivity and/or flow rate of effluent from the acid retardation system and/or of process water stream entering the acid retardation system. In certain embodiments, the sensors may detect or measure a process parameter and report the value to a processor of the control system. The processor of the control system may be configured to compare the detected or measured value with a target value. Responsive to a result of the comparison, the control system may be configured to select a dosage of acid or base to be added to the process water stream and/or control the flow of fluid into and/or out of the acid retardation system. The control system may be configured to start and stop the process water and water feed cycles. For example, it may be used to determine when to feed water through the vessel. Alternatively, it may be used to determine when to feed process water through the vessel.

In some embodiments, the acid retardation system may recycle at least a portion of the first effluent back to the vessel for further separation, for example, to recover additional phosphate from the first effluent. In some embodiments, the acid retardation system may recycle at least a portion of the second effluent back to the vessel for further separation, for example, to increase the purity of the recovered phosphoric acid. In other embodiments, the recycled first or second effluent is combined or blended with the process water stream. Portions of the first or second effluent having undesirable levels of undesirable salts, for example, sulfates or hexafluorosilicates, may be returned to a source of the process water. In another embodiment, the source water or feed water to the acid retardation unit comprises process water, recycled salt mixture effluent, recycled phosphoric acid effluent, and combinations thereof. Such recycle is achieved with the use of pumps. In some embodiments, the ratio of recycled effluent (recycled first effluent and/or recycled second effluent) to feed process water introduced into the sorption agent vessel is between about 0 and about 0.5.

In some embodiments, acid retardation systems disclosed herein include more than one sorption agent vessel. The use of multiple vessels may improve the purity or the recovery of phosphoric acid from the process water. In another embodiment, more than one sorption agent vessel is used in parallel in order to provide continuous operation. In another embodiment, a combination of series and parallel vessels are used. In another embodiment, the effluent from one vessel can be recycled to another vessel. Aspects and embodiments disclosed herein are not limited to the number or arrangement of the vessels, the position, direction or composition of the recycle streams, or composition of the process water. Reference to "a sorption agent vessel" in the present disclosure should be understood to encompass a single sorption agent vessel as well as multiple sorption agent vessels arranged in series and/or in parallel.

FIG. 1 schematically illustrates an acid retardation system 10 in accordance with one or more embodiments of the present disclosure. The acid retardation system 10 may comprise one or more acid retardation unit operations, which may include one or more adsorption and desorption processes. The acid retardation system 10 is provided with a process water stream from a source of process water 100. Source of process water 100 may be a water collection system from any one or more of a municipality, a residential community, an industrial or a commercial facility, and an upstream pre-treatment system, or combinations thereof. For example, source of phosphate-containing water 100 may be a sedimentation or settling tank receiving water from a phosphate manufacturing plant. The process water stream in the acid retardation system 10 may be pumped from the source of phosphate water 100 by one or more pumps with flow of the process water stream controlled by one or more valves (not shown) under control of a control system of the acid retardation system 10.

Source of process water 100 has a first concentration of phosphoric acid. For example, the phosphoric acid concentration of the source of process water 100 in the form of phosphorgypsum wastewater may be between about 10,000 mg/L and about 40,000 mg/L of phosphate. The economics of the process improve with higher concentrations of phosphate in the process water. The process water in the source of process water 100 may have a pH between about pH 0 and about pH 5.

The source of process water 100 is fluidly connected to an inlet 110 of an acid retardation unit 130 though a conduit 105. The inlet 110 includes a mixing chamber for mixing the process water stream with a pH adjustment agent and/or recycled effluent from the acid retardation unit 130 as is described in detail below. The mixing chamber can include any mixing system known in the art. Inlet 110 may be fluidly connected through conduit 115 to an inlet of a sorption agent vessel of acid retardation unit 130. In some embodiments, source of process water 100 is fluidly connected to the acid retardation unit 130 through a plurality of conduits. In some embodiments, acid retardation unit 130 comprises a plurality of process water inlets. Acid retardation unit 130 may operate at a predefined process water flow velocity to achieve a desired efficiency of recovery of phosphoric acid from process water from the source of process water 100. For example, the flow velocity may be adjusted, manually or by a computerized controller of the acid retardation system 10, depending on the desired phosphoric acid concentration and/or purity of an effluent of the acid retardation unit 130. In some embodiments, the acid retardation unit is operated at a volumetric flow velocity of the process water stream of between about 500 gallons per minute (gpm) and about 2,500 gpm.

Acid retardation unit 130 includes at least one sorption agent vessel 140. In some embodiments, the sorption agent vessel 140 is an ion exchange resin column. In some embodiments, the sorption agent vessel 140 is an anion exchange resin column. In some embodiments, acid retardation unit 130 includes a plurality of anion exchange resin columns 140. In some embodiments, the plurality of anion exchange resin columns 140 are arranged in at least one of in series, in parallel, and in a combination of series and parallel.

In some embodiments, the flow rate of the process water undergoing treatment through the sorption agent vessel 140 per unit volume of the sorption agent vessel 140 is between about 0.5 gpm/ft$^3$ and about 5.0 gpm/ft$^3$. In an embodiment, the flow rate of the process water undergoing treatment through the sorption agent vessel 140 corresponds to an empty bed contact time of between about 10 minutes and about 20 minutes, for example, about 15 minutes. In some embodiments, the empty bed contact time may be less than about 10 minutes. In some embodiments, the empty bed contact time may be more than about 20 minutes.

The sorption agent vessel 140 comprises a sorption agent. The sorption agent may be an adsorption agent or any agent that preferentially adsorbs phosphoric acid versus salts. In some embodiments, the sorption agent is an ion exchange resin. The ion exchange resin may be an anion exchange resin. The sorption agent can comprise a strongly or weakly basic polymeric resin. In an embodiment, quaternary styrene divinylbenze copolymer resins, for example, quaternary amine styrene divinylbenzene copolymers with uniform fine mesh particle size are used. Examples of suitable ion exchange resins include Dowex™ 1X8 50-100 mesh chloride form ion exchange resin or Purolite® PCA433 resin. The sorption agent may have a capacity of between about a 1.2 eq/l and about 1.3 eq/l, where eq/l is the number of equivalents of ionic species found in a liter of resin.

In alternative embodiments, the sorption agent vessel 140 comprises cation exchange resin. For example, the cation exchange resin may be one or more of Dowex™ 50WX2 resin, Dowex™ 50WX4 resin, Dowex™ 50WX8 resin, Purolite® PCR450 resin, Purolite® PCR633 resin, or Purolite® PCR833 resin.

The sorption agent can be sluiced into the sorption agent vessel 140. In some embodiments, the sorption agent vessel 140 can comprise at least one of a packed bed, a compressed bed, a moving bed, a simulated moving bed, and an intermittent simulated moving bed. In some embodiments, the sorption agent vessel 140 can comprise a packing configuration other than a packed bed, a compressed bed, a moving bed, a simulated moving bed, and an intermittent simulated moving bed.

As process water undergoing treatment passes through the sorption agent vessel 140, a first effluent containing a first concentration of at least one salt and a second concentration of phosphoric acid is withdrawn from acid retardation unit 130 through effluent conduit 145. The effluent conduit 145 may include a sensor 150, or a plurality of such sensors, which is configured to measure a quality of the first effluent. The sensor 150 can measure, for example, the first concentration of the at least one salt and/or the second concentration of phosphoric acid and/or the pH and/or conductivity of the first effluent. Sensor 150 may also include a flow rate sensor for measuring a flow rate of effluent through the effluent conduit 145 and providing an indication of the flow rate to controller 160 of the system.

The sensor 150 may be an ion specific phosphate probe or sensor, an online colorimetric phosphate analyzer, a phosphoric acid concentration sensor and/or a salt concentration sensor. The sensor may be, for example, an online phosphate analyzer such as a Hach® 5500 phosphate analyzer or a Hach® Phosphax phosphate analyzer. The sensor 150 may communicate, electrically or otherwise, with controller 160 to provide the controller with a signal indicative of a concentration of phosphoric acid and/or salt in the first effluent. The controller controls valve 180 to direct effluent from the acid retardation unit 130 to one of a high salts effluent storage 185 or a recovered phosphoric acid storage 190 based on, for example, the purity and/or concentration of phosphoric acid in the effluent and/or based on a timer or a total volume of effluent withdrawn from the acid retardation unit 130. For example, the controller may control valve 180 to switch the flow path of the first effluent or the second effluent based on a predetermined time after the first effluent or second effluent began to be withdrawn from the acid retardation unit 130 or after a predetermined volume of the first effluent or second effluent was withdrawn from the acid retardation unit 130. The predetermined times and/or volumes may have been previously calculated or determined such that an acceptable quantity and quality of recovered phosphoric acid is captured in the recovered phosphoric acid storage 190. Effluent directed into the high salts effluent storage 185 may be recycled through the acid retardation unit 130 to recover additional phosphate or may be further treated for discharge to the environment or disposed of, for example, by returning it to the source of process water 100. Effluent directed to the recovered phosphoric acid storage 190 may be withdrawn and further treated, for example, concentrated, to produce a salable or reusable phosphoric acid product or may be recycled through the acid retardation unit 130 for further purification.

Signals from sensor 150 may also be used by controller 160 to regulate the volumes of process water 100 or water 120. The controller may be programmed to reduce the volume of process water 100 for the next cycle if there is too much overlap of salts with phosphoric acid. Conversely, the controller may be programmed to increase the volume of process water 100 if there is too large of a separation between the salt and phosphoric acid peaks. The volume of water 120 may be increased if the concentration of phosphoric acid is too high in the byproduct or may be decreased if the concentration of phosphoric acid drops below a setpoint for the byproduct.

The controller 160 also controls the addition of a source of pH adjuster 170 to the mixing chamber of inlet 110 through conduit 175. The controller 160 may control a pump (not shown) to transfer a pH adjuster from the source of pH adjuster 170 to mixing chamber of inlet 110. The pH of the process water stream may be adjusted by mixing with the pH adjuster in the mixing chamber of inlet 110 depending on the desired end-use of the phosphoric acid. For example, a higher pH of the process water stream produces a higher-purified phosphate. In contrast, a lower pH of the process water stream produces a greater volume of phosphate, but at a lower level of purity. The pH of the process water stream may be monitored by pH sensor 155. An indication of the pH of the process water stream is communicated from the pH sensor 155 to the controller 160. The controller 160 controls the rate of addition of pH adjuster to the process water stream based on a comparison between the indication of pH from the pH sensor 155 and a desired or target pH. The pH adjuster may comprise, for example, sodium hydroxide and/or sulfuric acid.

The controller 160 of the systems disclosed herein may be implemented using one or more computer systems. The computer system may be, for example, a general-purpose computer such as those based on an Intel® CORE™ type processor or Intel® Atom™ type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended for analytical systems.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the treatment system and/or computer system. Software, including programming code that implements embodiments of the invention, can be stored on a computer readable and/or writable nonvolatile recording medium, and then typically copied into memory wherein it can then be executed by the processor. Components of the computer system may be coupled by an interconnection mechanism, which may include one or more busses (e.g., between components that are integrated within a same device) and/or a network (e.g., between components that reside on separate discrete devices). The interconnection mechanism enables communications (e.g., data, instructions) to be exchanged between components of the computer system. The computer system can also include one or more input devices, for example, sensors such as sensors 150, 155, a keyboard, mouse, trackball, microphone, touch screen, and one or more output devices, for example, a printing device, display screen, or speaker. In addition, the computer system may contain one or more interfaces that can connect the computer system to a communication network (in addition or as an alternative to the network that may be formed by one or more of the components of the computer system).

According to one or more embodiments, the one or more input devices may include sensors for measuring parameters. Alternatively, the sensors, the flow monitors and valves and/or pumps of the acid retardation system 10, or all of these components may be connected to a communication network that is operatively coupled to the computer system.

The controller can include one or more computer storage media such as readable and/or writeable nonvolatile recording medium in which signals can be stored that define a program to be executed by one or more processors. Storage medium may, for example, be a disk or flash memory. Although the computer system may be one type of computer system upon which various aspects may be practiced, it should be appreciated that aspects and embodiments are not limited to being implemented in software, or on a general purpose computer system. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects may be implemented in software, hardware or firmware, or any combination thereof. For example, one or more segments of an algorithm executable by the controller can be performed in separate computers, which in turn, can be communication through one or more networks.

A source of water 120 is fluidly connected through conduit 125 to an inlet of acid retardation unit 130. The source of water 120 may be filtered to reduce a quantity of suspended solids or eliminate suspended solids from water from the source of water 120. In some embodiments, the source of water 120 may be filtered by a multimedia filter, a check filter, a membrane filter, or a combination of filters. In other embodiments, the source of water 120 may be filtered by ultrafiltration. In alternative embodiments, source of water 120 may be filtered by microfiltration. In some embodiments, the source of water is condensate or RO permeate from concentrating phosphoric acid product 190. In some embodiments, the source of water 120 is filtered to filter out suspended solids greater than about 1 μm in size. Source of water 120 may comprise distilled water. Acid retardation unit 130 may operate at a desired water flow velocity to achieve a desired or optimized efficiency. The water flow velocity may be adjusted by a pump or valve (not shown) controlled manually or by the controller 160, depending on the desired phosphoric acid volume, concentration, or purity of an effluent. In some embodiments, a water flow velocity of between about 0.5 gpm/ft$^3$ and about 5.0 gpm/ft$^3$, for example, about 2.5 gpm/ft$^3$ is suitable. Source of water 120 provides filtered water which does not include a substantial amount of suspended solids that could plug the sorption agent vessel 140. In addition, water from source of water 120 can be low in dissolved salts or deionized so as not to contaminate the recovered phosphoric acid.

In an embodiment, water from source of water 120 is directed to the acid retardation unit 130 after the first effluent has eluted to rinse remaining process water from the sorption agent vessel 140 and phosphoric acid from the sorption agent. Rinsing the phosphoric acid from the sorption agent provides a second effluent from which phosphoric acid may be recovered and readies the sorption agent vessel 140 for the next separation cycle. The source of water 120 contacts the sorption agent within the sorption agent vessel 140. A first portion of the water passed through the vessel 140, for example, from about 0.5 to about one bed volume of water, rinses process water remaining in the vessel from the vessel and results in a first portion of a second effluent high in dissolved salts. After the remaining process water is rinsed from the vessel 140, at least a portion of the phosphoric acid adsorbed in the sorption agent is desorbed from the sorption agent into the water to form a second portion of the second effluent having a third concentration of phosphoric acid.

The second effluent containing the third concentration of phosphoric acid is withdrawn from acid retardation unit 130 through effluent conduit 145. The second effluent is directed by valve 180, under the control of controller 160, to one of a high salts effluent storage 185 or recovered phosphoric acid storage 190 based on, for example, the purity of phosphoric acid in the effluent and/or based on a timer or a totalized volume of second effluent withdrawn from the acid retardation unit 130. The first portion of the second effluent having a relatively low phosphoric acid concentration and a relatively high salts concentration may be directed into the high salts effluent storage 185. The second portion of the second effluent having a phosphoric acid concentration greater than that of the first portion and a lower salts concentration than the first portion of the second effluent may be directed into the recovered phosphoric acid storage 190. Effluent from the recovered phosphoric acid storage 190 may be recovered and concentrated, for example, by the removal of water by evaporation, membrane filtration, or other techniques to produce a concentrated product phosphoric acid. In some embodiments a portion of the effluent from the recovered phosphoric acid storage 190 may be recycled into the acid retardation unit 130 for further purification.

Figure 2:
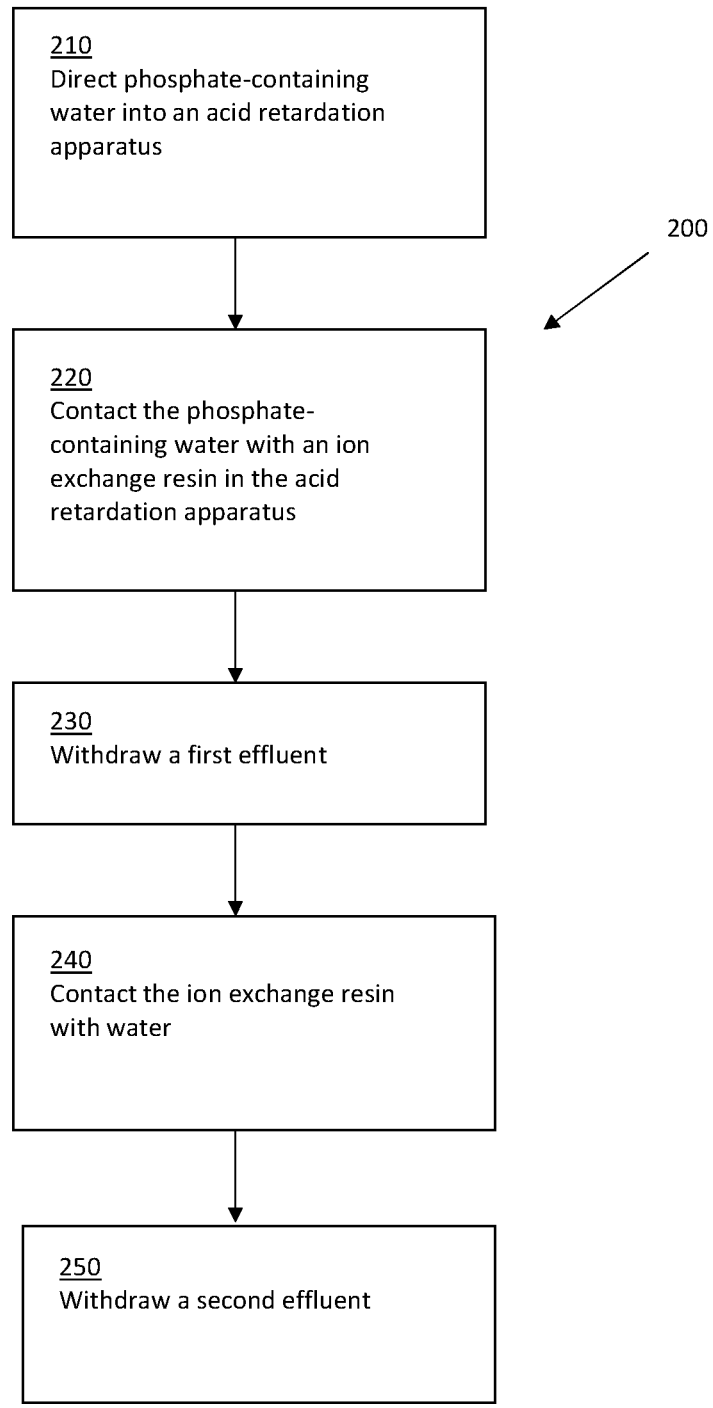
FIG. 2 is a flow chart of a method pertinent to one or more aspects of this disclosure.

FIG. 2 is a flow chart of a method, indicated generally at 200, of operating an acid retardation system to treat process water. During operation, the process water stream from a source of process water 100 is directed into an acid retardation unit 130 (act 210).

The process water stream is contacted with the sorption agent in the sorption agent vessel 140 within the acid retardation unit 130 (act 220) to remove phosphate from the process water by adsorbing phosphoric acid onto the sorption agent. In an embodiment, a first effluent containing a first concentration of the at least one salt and a second concentration of phosphoric acid is withdrawn from acid retardation unit 130 through effluent conduit 145 (act 230).

Water from a source of water 120 is directed through the acid retardation unit 130 after the first effluent has eluted. The water contacts the sorption agent within the sorption agent vessel 140 (act 240). At least a portion of the phosphoric acid in the sorption agent are desorbed from the sorption agent into the water to form a second effluent having a third concentration of phosphoric acid.

The second effluent containing the third concentration of phosphoric acid is withdrawn from acid retardation unit 130 through effluent conduit 145 (act 250). Phosphoric acid is recovered from the second effluent.

Figure 3:
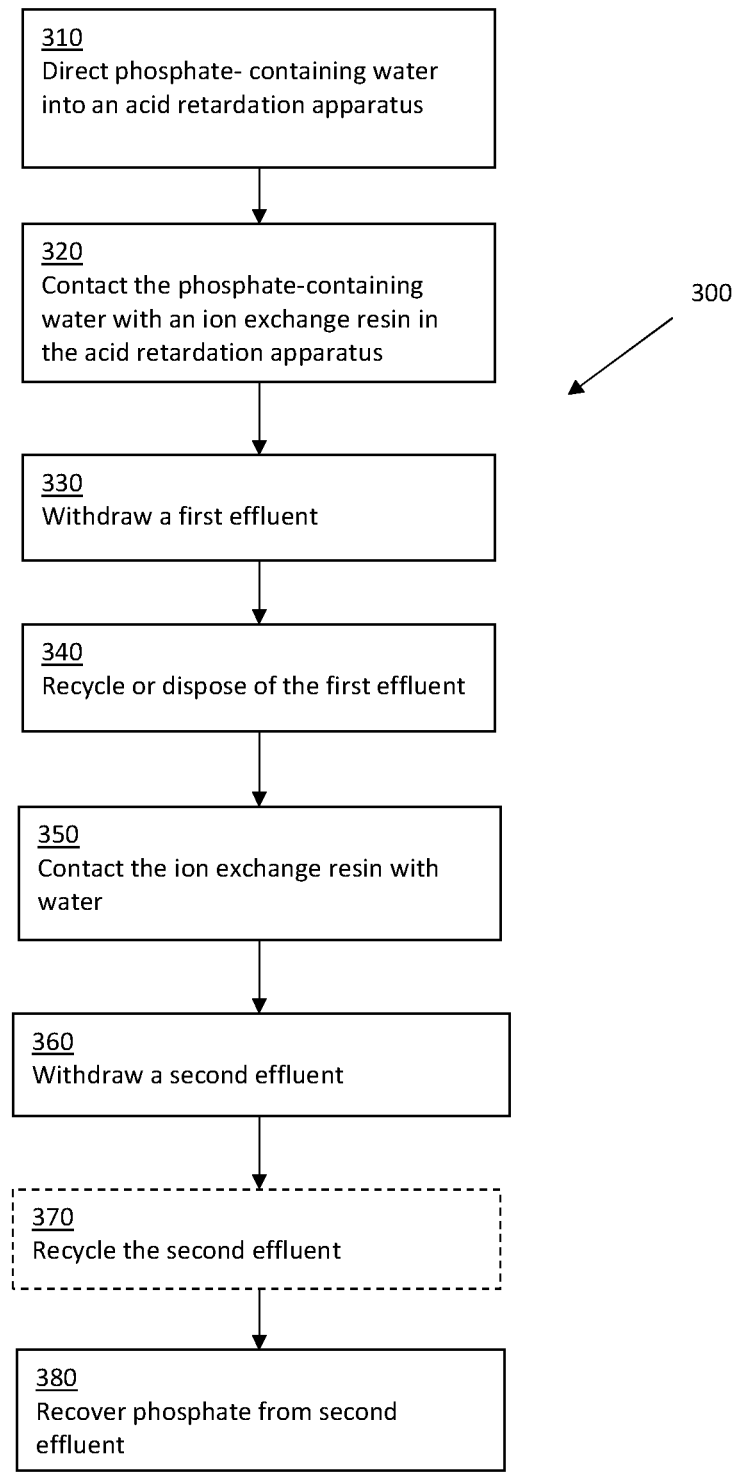
FIG. 3 is a flow chart of a method pertinent to one or more aspects of this disclosure.

Another embodiment of a method of operating an acid retardation system to treat process water is illustrated generally at 300 in FIG. 3. During operation, a process water stream from a source of process water 100 is directed into an acid retardation unit 130 (act 310).

The process water stream is contacted with the sorption agent in the sorption agent vessel 140 within the acid retardation unit 130 (act 320) to remove at least a portion of the phosphoric acid from the process water by absorption of phosphoric acid into the sorption agent. A first effluent containing a first concentration of the at least one salt and a second concentration of phosphoric acid is withdrawn from acid retardation unit 130 through effluent conduit 145 (act 330). At least a portion of the first effluent is recycled to the inlet 110 of the acid retardation unit 130, and optionally mixed with the influent process water stream, (act 340) to recover additional phosphoric acid from the first effluent. For example, the percentage by volume of recycled effluent may be about 0% to about 50% of the influent process water 100 to be treated. Alternatively or additionally, a portion or a totality of the first effluent may be sent for further treatment and discharge to the environment or disposed, for example, by being returned to the source of process water 100.

Water from a source of water 120 is directed into the acid retardation unit 130 after the first effluent has eluted. The water contacts the sorption agent within the sorption agent vessel 140 (act 350). At least a portion of the phosphoric acid in the sorption agent desorbs into the water to form a second effluent having a third concentration of phosphoric acid.

The second effluent containing the third concentration of phosphoric acid is withdrawn from acid retardation unit 130 through effluent conduit 145 (act 360). Optionally, a portion of the second effluent is recycled to the inlet 110 of the acid retardation unit 130, and optionally mixed with the influent process water stream, (act 370) to further purify or concentrate the phosphoric acid in the second effluent. For example, the percentage by volume of recycled effluent may be about 0% to about 50% of the influent process water 100 to be treated. If the second effluent contains phosphoric acid of a desired purity, the second effluent may be captured and the phosphoric acid recovered as a phosphoric acid product (act 380).

Figure 4:
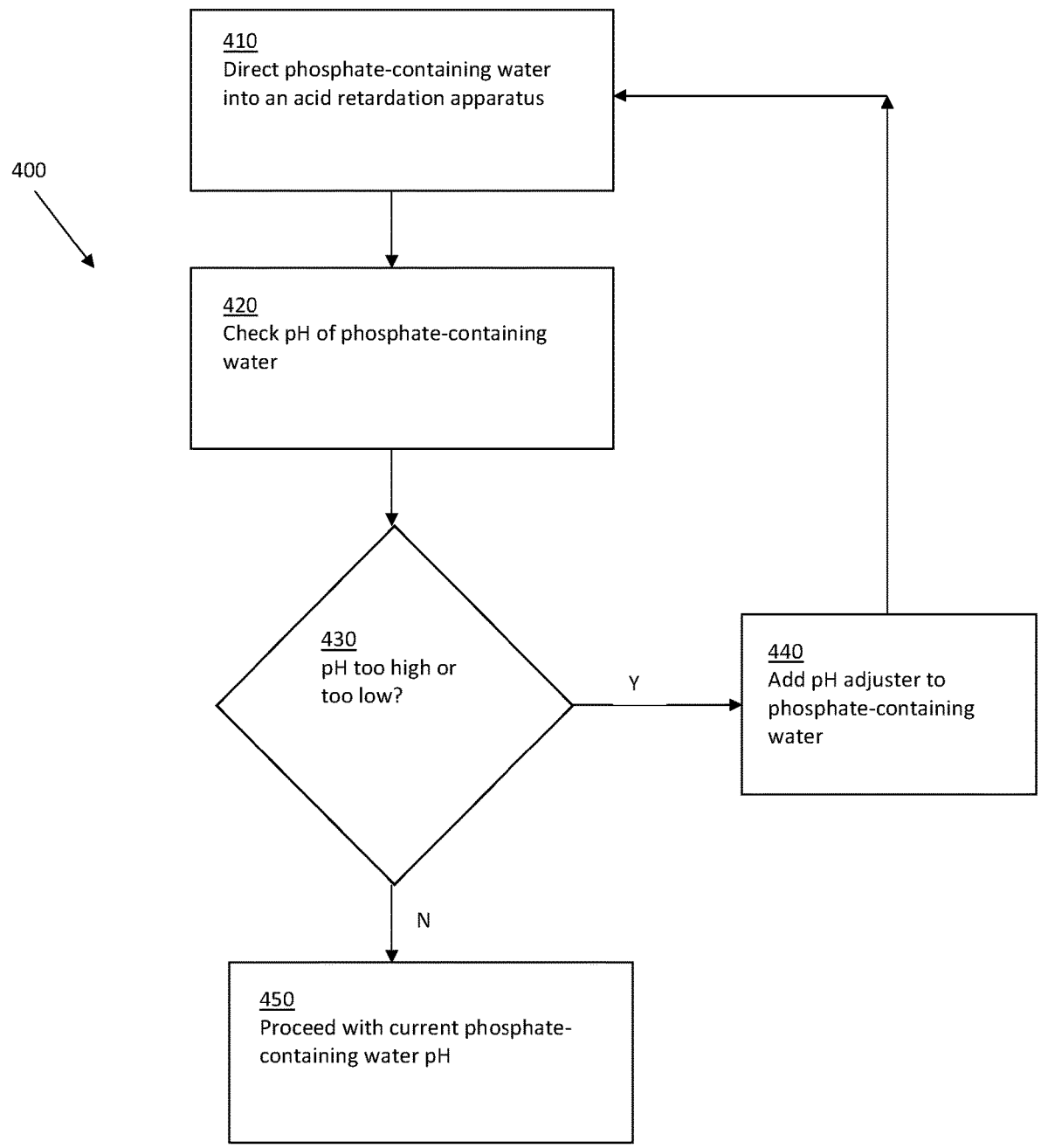
FIG. 4 is a flow chart of a method pertinent to one or more aspects of this disclosure.

A method of controlling an acid retardation system to treat process water is illustrated generally at 400 in FIG. 4. A control system including a controller 160 and one or more sensors, for example, sensors 150, 155 controls the pH of the process water stream in the acid retardation system. During operation, the pH of the process water stream is monitored (act 420) by the sensor 155 and/or controller 160. The pH of the process water stream is compared, for example, by the controller 160 to a desired or target pH or pH range (decision 430). If pH sensor 155 measures a pH of the process water stream being different from, for example, exceeding the desired or target pH or pH range, the pH of the process water stream is adjusted (act 440). The pH may be adjusted until the measured pH of the process water stream returns to, goes above, or drops below the desired or target pH or desired or target pH range.

The desired or target pH or pH range of the process water stream may be selected based on the desired end use of the phosphoric acid to be recovered from the process water. For example, as discussed above, acid retardation treatment of process water having a high pH produces a higher purity phosphoric acid than acid retardation treatment of process water having a lower pH. In contrast, acid retardation treatment of process water having a low pH produces a greater volume of phosphoric acid, but at a lower level of purity. A higher pH yields higher purity phosphoric acid, while a lower pH yields a greater amount of recovered phosphoric acid. At a higher pH, a greater amount of sulfate and hexafluorosilicate are present as salts rather than as acids, enabling better separation of these impurities from phosphoric acid. However, a higher pH causes more phosphate to be present as salt and not readily recovered. At a lower pH, a greater amount of sulfate and hexafluorosilicate are present as acids rather than as salts. These impurities are more likely to elute with the phosphoric acid to be recovered. However, a lower pH causes more phosphate to be present as phosphoric acid, and is therefore more readily recoverable.

The recovered phosphoric acid concentration may be, for example, above about 0.5% by weight, and up to about 2% by weight. This target concentration is exemplary only and may vary depending upon a desired quality of phosphoric acid produced from the acid retardation system which may be determined based on the desired end use of the phosphoric acid effluent. The recovered phosphoric acid purity may be, for example, about 80% or more, or above about 87%. The purity of the phosphoric acid in the second effluent may be higher than the purity of the phosphoric acid in the process water.

The control system of the acid retardation system may be calibrated prior to beginning operation or may undergo periodic calibrations to determine volumes of the process water and purified water to run through the acid retardation unit 130 to achieve a desired quantity and/or concentration of recovered phosphoric acid. The control system of the acid retardation system may be calibrated prior to beginning operation or may undergo periodic calibrations to determine fractions of the first and/or second effluent to be recycled or retained for phosphoric acid recovery and fractions of the first and/or second effluent to be recycled, discarded, or further treated for discharge to the environment.

Another possible method to remove phosphate compounds from process water is ion exclusion. Ion exclusion is similar to acid retardation in that a quantity of feed solution is contacted with a resin and eluted with water. Ion exclusion uses a cation exchange sorption agent, for example, a cation exchange resin, instead of an anion exchange sorption agent. The mode of separation is different as well. In ion exclusion, cations are excluded from entering into the sorption agent while nonionic species can diffuse into the agent. The equilibrium concentration of ionic species in the sorption agent is less than the equilibrium concentration of the process water comprising both ionized and nonionized species. The ionized species in the process water, such as the salts, travel around the sorption agent particles and are not adsorbed. The nonionized species, including the phosphoric acid, diffuse into the sorption agent. The result is salts elute first and nonionic species elute second when purified water is passed through a vessel including the sorption agent after process water is passed through the vessel. Phosphoric acid is nonionic at low pH, which makes ion exclusion a possible method for phosphoric acid purification.

Example 1

A lab test was performed using 50 ml Dowex™ 1X8 50-100 mesh chloride form anion exchange resin. The resin was loaded into a ⅝" internal diameter glass chromatography column. Process water having the concentration of constituents (in ppm) illustrated in the first row of Table 1 below was filtered through a 0.8 micron filter.

Alternating volumes of process water and high-purity water were run through the column of Dowex™ 1X8 50-100 mesh chloride form anion exchange resin until there was a good material balance between ions in the process water and the column effluent. This step ensured that the observed phosphoric acid purification was due to acid retardation and not due to ion exchange. This step also converted the resin from the chloride form to a mixture of phosphate, sulfate, and hexafluorosilicate, which would be identical to the form of the resin after long term use.

The pH of the process water was about 2. pH adjustment was considered but not used. The ratio of cations and anions to nonionized phosphoric acid was nearly ideal (i.e., sulfate and hexafluorosilicate would be present as salts while phosphate would be present as phosphoric acid).

The test design used alternating 30 ml volumes of process water and 110 ml high-purity water. The high-purity elution water was high-purity deionized water having a resistivity greater than 1.0 MΩ-cm. Five consecutive runs were made. The effluent from the last two runs was collected in 10 ml samples. Those samples plus the process water were analyzed for the constituents present in the pond water. The data were tabulated and plotted. A mass balance was created to demonstrate the method of phosphoric acid purification was acid retardation and not ion exchange.

Table 1 illustrates concentrations of constituents of effluent from the vessel as a function of bed volumes of process water and elution water fed through the column. At a bed volume of 0.0 process water was fed through the column. The process water was fed through the column for 0.6 bed volumes. As the volume of process water passed through the column increased, the purity of the effluent decreased, indicating the absorption of phosphate into the ion exchange resins. Following this process, elution water was fed through the column. The elution water was fed through the column until a cumulative volume of 2.8 bed volumes of fluid had been passed through the column. Effluent purity increased with increased flow of elution water through the column and peaked at a cumulative flow of fluid of about 1.9 bed volumes through the column. Effluent purity decreased after an about 1.9 cumulative bed volumes of fluid had passed through the column until the neutral water stopped being fed into the column at 2.8 cumulative bed volumes. The process was then repeated, with the process water fed through the column from 2.8 to about 3.4 cumulative bed volumes of fluid passed through the column, and neutral water fed through the ion exchange resin after a cumulative volume of 3.4 bed volumes of fluid had passed through the column. The purity of the effluent was highest when the neutral water was fed, indicating the desorption of phosphate from the ion exchange resins into the neutral water.

Effluent from the column was collected as byproduct water at from about 0.4 through about 1.2 and from about 3.2 through 4.0 cumulative bed volumes of fluid passed through the column. The remainder of the effluent was collected as product water. The constituents of the product and byproduct water are indicated toward the bottom of Table 1. The recovery (percent in product water) and rejection (percent in byproduct water) percentages were calculated. From Table 1, it can be seen that a phosphoric acid recovery of about 82% was achieved while other impurities in the product water were substantially rejected. These results show that acid retardation may be an effective method of separating phosphoric acid from ionized impurities in process water.

Figure 5:
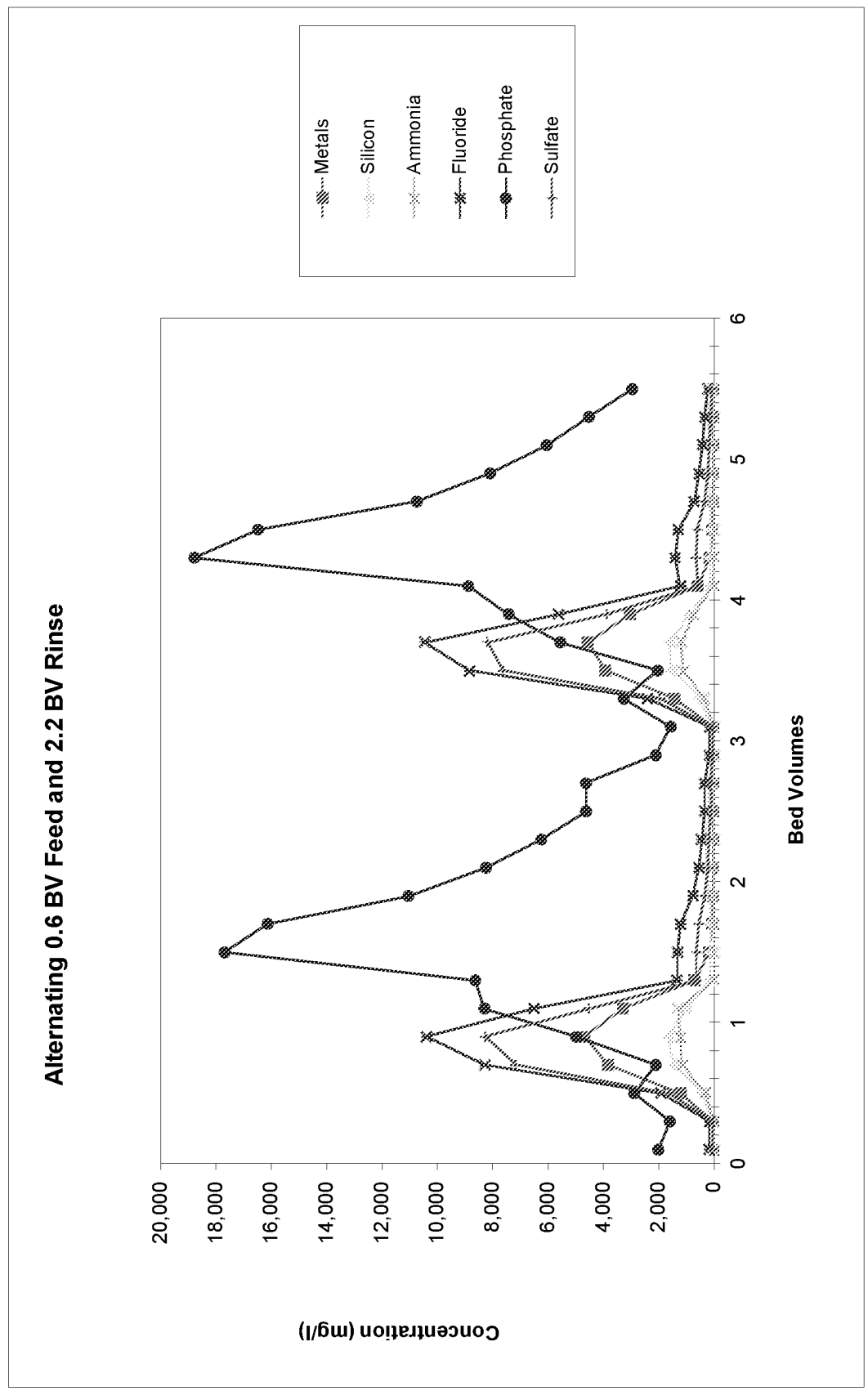
FIG. 5 is a graph illustrating the results of a representative acid retardation method pertinent to one or more aspects of the disclosure.
Figure 6:
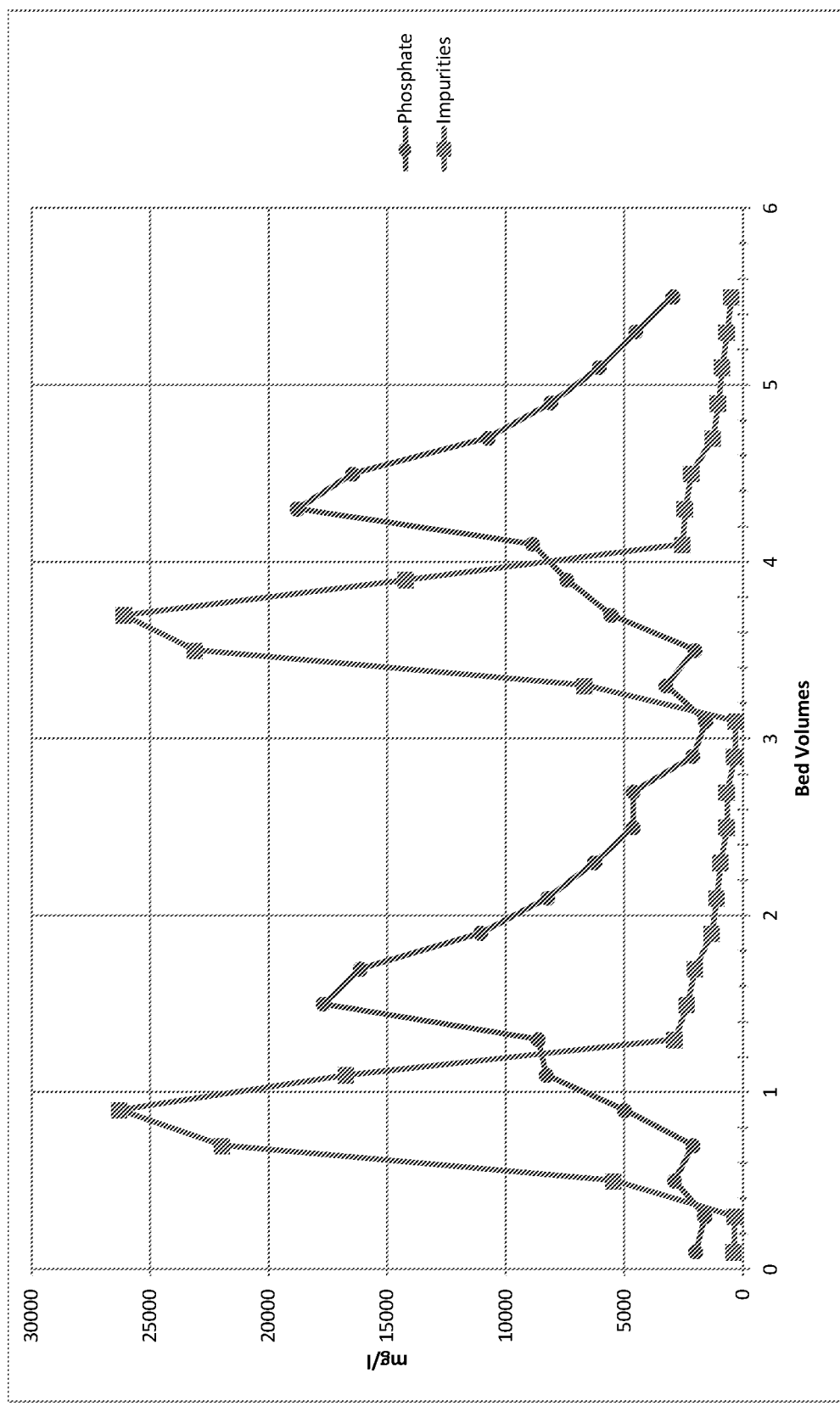
FIG. 6 is a second graph illustrating the results of a representative acid retardation method pertinent to one or more aspects of the disclosure.

FIG. 5 and FIG. 6 are graphs illustrating the results shown in Table 1. FIG. 5 charts the concentration of phosphate and ionic impurities in effluent from the column as a function of cumulative bed volumes of fluid passed through the column. FIG. 6 combines the concentrations of the various impurities into a single variable. As can be seen, the ionic impurities other than phosphate (phosphoric acid) eluted prior to the phosphate with increasing bed volumes of fluid passed through the column. The concentrations of impurities and phosphate showed well separated distributions with by increasing bed volumes of fluid passed through the column. These results show that using an acid retardation process, it is possible to separate phosphate from the other ionic compounds to obtain a purified phosphate solution or phosphoric acid from process water.

TABLE 1

Results of Acid Retardation Test

| BV | Metals | Silicon | Ammonia | Fluoride | Phosphate | Sulfate | Total | Purity | Not PO4 |
|---|---|---|---|---|---|---|---|---|---|
| Feed | 4765 | 2140 | 1218 | 9249 | 28609 | 6771 | 53125 | 54% | 24517 |
| 0.1 | 13 | 103 | 0 | 168 | 2002 | 60 | 2380 | 84% | 378 |
| 0.3 | 24 | 73 | 1 | 159 | 1595 | 54 | 1925 | 83% | 330 |
| 0.5 | 1195 | 408 | 290 | 1905 | 2876 | 1613 | 8318 | 35% | 5441 |
| 0.7 | 3821 | 1460 | 1150 | 8287 | 2100 | 7162 | 24061 | 9% | 21961 |
| 0.9 | 4669 | 1650 | 1220 | 10379 | 4980 | 8269 | 31270 | 16% | 26290 |
| 1.1 | 3290 | 1020 | 1273 | 6505 | 8292 | 4508 | 25013 | 33% | 16722 |
| 1.3 | 702 | 129 | 0 | 1322 | 8627 | 648 | 11489 | 75% | 2862 |
| 1.5 | 167 | 141 | 0 | 1318 | 17678 | 621 | 20026 | 88% | 2348 |
| 1.7 | 67 | 125 | 0 | 1200 | 16127 | 546 | 18134 | 89% | 2007 |
| 1.9 | 33 | 134 | 0 | 760 | 11038 | 321 | 12340 | 89% | 1301 |
| 2.1 | 23 | 267 | 0 | 543 | 8225 | 212 | 9323 | 88% | 1098 |
| 2.3 | 21 | 264 | 0 | 435 | 6241 | 179 | 7170 | 87% | 929 |
| 2.5 | 21 | 179 | 0 | 326 | 4614 | 109 | 5278 | 87% | 664 |
| 2.7 | 21 | 179 | 0 | 326 | 4614 | 109 | 5278 | 87% | 664 |
| 2.9 | 12 | 90 | 0 | 164 | 2100 | 52 | 2439 | 86% | 339 |
| 3.1 | 19 | 64 | 1 | 135 | 1557 | 49 | 1845 | 84% | 288 |
| 3.3 | 1414 | 502 | 349 | 2388 | 3250 | 1948 | 9908 | 33% | 6658 |
| 3.5 | 3917 | 1520 | 1100 | 8843 | 2019 | 7617 | 25125 | 8% | 23107 |
| 3.7 | 4558 | 1630 | 1180 | 10428 | 5548 | 8176 | 31645 | 18% | 26097 |
| 3.9 | 3031 | 865 | 717 | 5608 | 7418 | 3877 | 21612 | 34% | 14194 |
| 4.1 | 576 | 105 | 15 | 1208 | 8867 | 575 | 11409 | 78% | 2542 |

TABLE 1-continued

Results of Acid Retardation Test

| BV | Metals | Silicon | Ammonia | Fluoride | Phosphate | Sulfate | Total | Purity | Not PO4 |
|---|---|---|---|---|---|---|---|---|---|
| 4.3 | 148 | 135 | 0 | 1393 | 18782 | 646 | 21209 | 89% | 2428 |
| 4.5 | 63 | 120 | 0 | 1292 | 16458 | 592 | 18621 | 88% | 2163 |
| 4.7 | 34 | 135 | 0 | 705 | 10738 | 321 | 11992 | 90% | 1254 |
| 4.9 | 24 | 223 | 0 | 529 | 8087 | 215 | 9121 | 89% | 1034 |
| 5.1 | 21 | 219 | 0 | 413 | 6042 | 159 | 6894 | 88% | 852 |
| 5.3 | 18 | 173 | 0 | 323 | 4509 | 117 | 5177 | 87% | 668 |
| 5.5 | 13 | 144 | 0 | 213 | 2941 | 77 | 3412 | 86% | 471 |
| In | 286 | 128 | 73 | 555 | 1717 | 406 | 3188 | | |
| Out | 279 | 121 | 73 | 673 | 1973 | 488 | 3624 | | |
| Out/In | 98% | 94% | 100% | 121% | 115% | 120% | 114% | | |
| Product | 20 | 30 | 0 | 129 | 1608 | 57 | 1855 | 87% | |
| By-Product | 259 | 91 | 73 | 543 | 365 | 432 | 1770 | 21% | |
| Recovery | 7% | 25% | 0% | 19% | 82% | 12% | | | |
| Rejection | 93% | 75% | 100% | 81% | 18% | 88% | | | |

The pH of the process water may be adjusted to affect the purity and recovery of phosphoric acid. Increasing the pH increases the percentage of all anions present as salts, which results in less phosphoric acid recovered in the acid fraction, but at a higher purity. Decreasing the pH increases the percentage of all anions present as acids, which results in more phosphoric acid recovered in the acid fraction, but at a lower purity.

For example, a mixture of hydrofluorosilicic acid ($H_2SiF_6$), sulfuric acid ($H_2SO_4$) and phosphoric acid ($H_3PO_4$), would exhibit no separation of hexafluorosilicate and sulfate from phosphate because all acids would be retarded by the sorption agent. Adding sodium hydroxide to the mixture increases the pH and converts the hydrofluorosilicic acid and sulfuric acid to their respective salts before converting phosphoric acid to its salt. The resulting sodium hexafluorosilicate and sodium sulfate can be separated from phosphoric acid. However, the addition of too much sodium hydroxide would convert phosphoric acid to sodium phosphate, which would not be recovered in the acid fraction.

As another example, a mixture of sodium hexafluorosilicate, sodium sulfate and sodium phosphate, all in salt form would elute in the salt fraction and no phosphoric acid would be recovered in the acid fraction. Adding sulfuric acid would decrease the pH and convert the sodium phosphate to phosphoric acid, while the added sulfuric acid would be converted to sodium sulfate. The phosphoric acid would be retarded by the sorption agent and recovered in the acid fraction. However, the addition of more sulfuric acid than there is sodium phosphate to convert to phosphoric acid results in more acids eluting in the acid fraction.

Example 2

Figure 7:
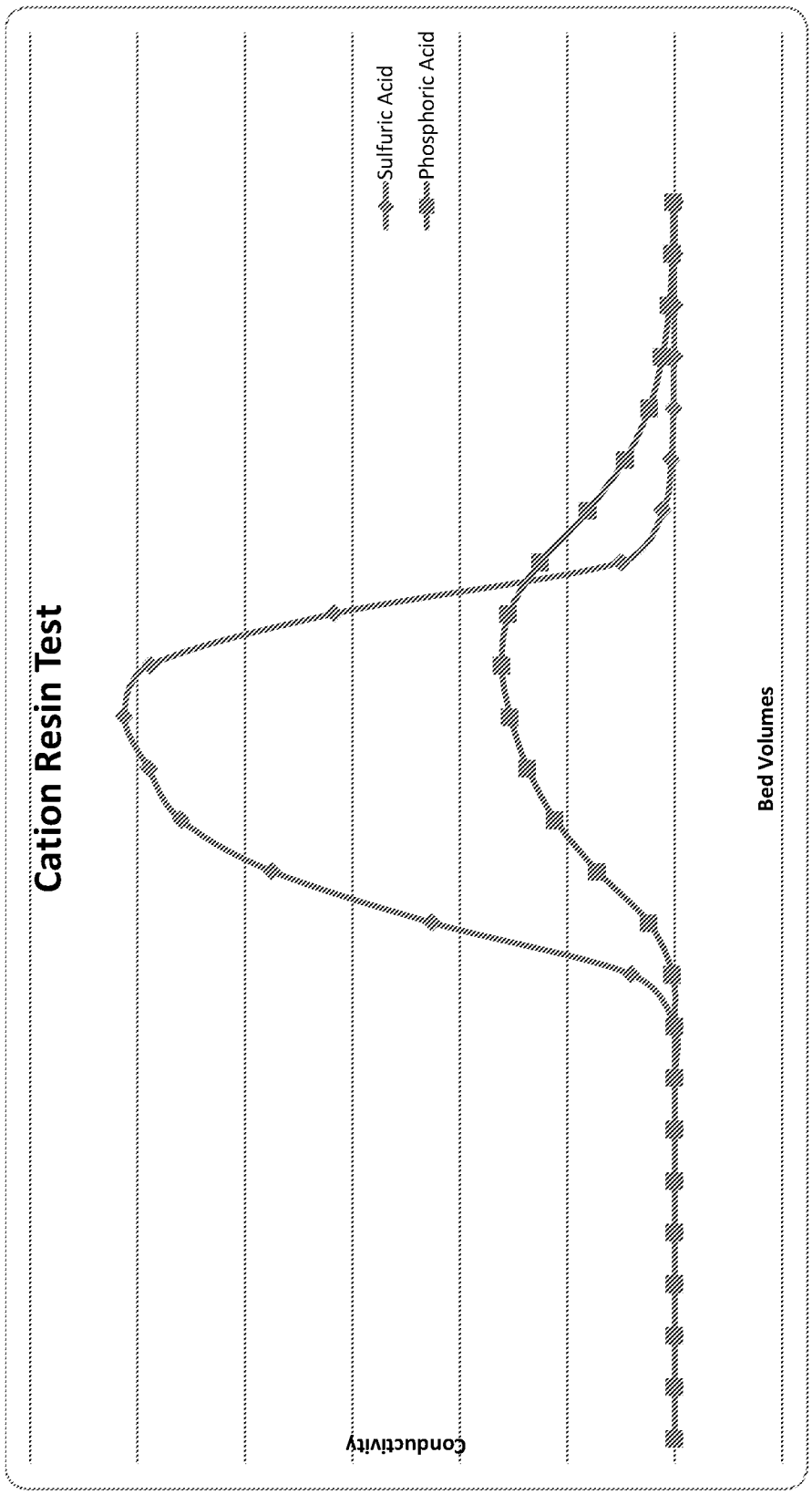
FIG. 7 is a graph illustrating the results of a representative ion exclusion method pertinent to one or more aspects of the disclosure.

The lab test used 50 ml Dowex™ 50X8 50-100 mesh hydrogen form cation exchange resin. The resin was loaded into a ⅝" internal diameter glass chromatography column. Two test solutions were tested independently. 10 ml quantities of 1 M sulfuric acid and 1 M phosphoric acid were run though the bed at different times and eluted with high purity water. The effluent was collected in 10 drop increments. Samples were diluted to 100 ml and conductivity was measured as a surrogate for acid concentration. The results are presented in FIG. 7. As can be seen, the sulfuric acid, which existed as ionized species in the feed water, eluted at a lower quantity of bed volumes of fluid passed through the column than the phosphoric acid, which existed as a nonionized species in the feed water. These results show that nonionized phosphoric acid is retained in cationic ion exchange resin for a greater quantity of bed volumes of elution water than ionized sulfuric acid thus providing a method to separate ionized sulfuric acid from nonionized phosphoric acid in an ion exclusion process.

Aspects and embodiments disclosed herein are not limited to a particular design of vessels or ion exchange columns or to the type of sorption agent used. Both anion and cation exchange resins can be used. Sorption agents with a range of cross linking percentage can be used, for example, from about 2% to about 16%. It may be preferable to use a smaller particle sorption agent to improve separation and kinetics. For example, the particle size may be 50 to 100 mesh (150 μm to 300 μm) rather than the more standard size used in typical ion exchange processes which may be 20 to 40 mesh (425 μm to 850 μm). The water used for elution can be of any quality that does not form precipitates with the process water or contribute undesirable impurities to the phosphoric acid product. Preferably, some type of water purification apparatus and method is utilized to purify the water used for elution.

Those skilled in the art should appreciate that the parameters and configurations described herein are exemplary and that actual parameters and/or configurations will depend on the specific application in which the disclosed systems and techniques are used. Those skilled in the art should also recognize or be able to ascertain, using no more than routine experimentation, equivalents to the specific embodiments disclosed. For example, those skilled in the art may recognize that the system, and components thereof, according to the present disclosure may further comprise a network or systems or be a component of an acid retardation system. It is therefore to be understood that the embodiments described herein are presented by way of example only and that, within the scope of the appended claims and equivalents thereto; the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve connecting or configuring an existing facility to comprise an acid retardation system or components of an acid retardation system, for example, using the methods and systems comprising a pH of wastewater to be treated controlled at least in part responsive to phosphoric acid species concentration measurements in the acid retardation system as disclosed herein. Accordingly the foregoing description and figures are by way of example only. Further the depictions in the figures do not limit the disclosures to the particularly illustrated representations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While exemplary embodiments of the disclosure have been disclosed, many modifications, additions, and deletions may be made therein without departing from the spirit and scope of the disclosure and its equivalents, as set forth in the following claims.

What is claimed is:

1. A system comprising:
    a vessel comprising a sorption agent;
    a source of a process water stream comprising a first concentration of phosphoric acid and at least one salt, the source of the process water stream fluidly connected to an inlet of the vessel;
    a source of water having an outlet fluidly connected to the vessel;
    an effluent outlet of the vessel;
    a valve fluidly coupled to the effluent outlet of the vessel;
    a high salts effluent storage unit fluidly coupled to the valve;
    a recovered phosphoric acid storage unit fluidly coupled to the valve;
    a source of a pH adjuster fluidly connected to the process water stream;
    a pH sensor configured to detect a pH of the process water stream and to output a pH signal indicative of the pH; and
    a controller operably coupled to the pH sensor and to the source of pH adjuster, the controller configured to receive the pH signal and to send a control signal to the source of pH adjuster causing the source of pH adjuster to dispense pH adjuster into the process water stream to be treated in response to receiving the signal, the controller configured to dispense pH adjuster to adjust the pH of the process water stream to be between about 1 and about 1.5 in a first mode or between about 2 and about 3 in a second mode,
    wherein the controller is further operably coupled to the valve and configured to control the valve to output a first effluent stream having a second concentration of phosphoric acid through the effluent outlet to the high salts effluent storage unit for a first period of time and to output a second effluent having a third concentration of phosphoric acid through the effluent conduit to the recovered phosphoric acid storage unit for a second period of time, the third concentration being higher than the second concentration.

2. The system of claim 1, wherein the vessel comprises a plurality of sorption agent columns arranged one of in series, in parallel, and in a combination of series and parallel.

3. The system of claim 1, wherein the sorption agent disposed in the vessel comprises cation exchange resin.

4. The system of claim 1, wherein the sorption agent disposed in the vessel comprises anion exchange resin.

* * * * *